(12) United States Patent
Shemesh et al.

(10) Patent No.: US 11,449,728 B2
(45) Date of Patent: Sep. 20, 2022

(54) METHOD OF OPTIMIZATION OF OPERATING A CONVOLUTIONAL NEURAL NETWORK AND SYSTEM THEREOF

(71) Applicant: Al Falcon Ltd., Herzliya (IL)

(72) Inventors: Ariel Shemesh, Ness Harim (IL); Alexander Koltun, Petah Tikva (IL)

(73) Assignee: AL FALCON LTD., Herzliya (IL)

( * ) Notice: Subject to any disclaimer, the term of this patent is extended or adjusted under 35 U.S.C. 154(b) by 938 days.

(21) Appl. No.: 16/232,685

(22) Filed: Dec. 26, 2018

(65) Prior Publication Data

US 2020/0005119 A1    Jan. 2, 2020

Related U.S. Application Data

(60) Provisional application No. 62/692,784, filed on Jul. 1, 2018.

(51) Int. Cl.
| | | |
|---|---|---|
| *G06N 3/04* | (2006.01) | |
| *G06N 3/08* | (2006.01) | |
| *G06F 16/901* | (2019.01) | |
| *G06F 17/16* | (2006.01) | |

(52) U.S. Cl.
CPC ............ *G06N 3/04* (2013.01); *G06F 16/901* (2019.01); *G06F 17/16* (2013.01); *G06N 3/08* (2013.01)

(58) Field of Classification Search
CPC ............ G06N 3/049; G06N 3/02; G06N 3/08; G06N 20/00; G06N 3/088; G06N 5/02
See application file for complete search history.

(56) References Cited

U.S. PATENT DOCUMENTS

| | | | |
|---|---|---|---|
| 9,436,895 B1* | 9/2016 | Jones et al. | G06K 9/66 |
| 2016/0162782 A1 | 6/2016 | Park et al. | |
| 2016/0321540 A1 | 11/2016 | Towal | |
| 2017/0337471 A1* | 5/2017 | Kadav et al. | G06N 3/08 |
| 2017/0337472 A1 | 11/2017 | Durdanovic et al. | |
| 2018/0137406 A1 | 5/2018 | Howard | |

(Continued)

OTHER PUBLICATIONS

Anshumali Shrivastava et al., "Improved Densification of One Permutation Hashing", (2014) https://arxiv.org/pdf/1406.4784.pdf.

(Continued)

*Primary Examiner* — Todd Buttram
(74) *Attorney, Agent, or Firm* — Browdy and Neimark, PLLC

(57) ABSTRACT

There are provided a system and method of optimization of operating a Convolutional Neural Network (CNN), the method including: for each given layer of the CNN, obtaining at least one input feature map, retrieving an index of one or more filters in the given layer; generating one or more output feature maps corresponding to the one or more filters, including: for each given block, querying the index to find a number of selected filters meeting a predetermined criterion related to respective inner products between the selected filters and the given block, applying the selected filters on the given block to obtain a number of output values for a given output position in a number of output feature maps corresponding to the number of selected filters, and filling in the given output position in the rest of output feature maps with a value of zero, thereby reducing the computational cost of operating the CNN.

29 Claims, 8 Drawing Sheets

(56) References Cited

U.S. PATENT DOCUMENTS

2018/0336468 A1    11/2018  Kadav et al.
2020/0005119 A1*   1/2020   Shemesh et al. ........ G06N 3/04

OTHER PUBLICATIONS

Alex Auvolant et al., "Clustering is Efficient for Approximate Maximum Inner Product Search", (2016) https://arxiv.org/pdf/1507.05910.pdf.
J. Ba et al., "Adaptive dropout for training deep neural networks, in Advances in Neural Information Processing Systems", pp. 3084-3092 (2013).
A. Makhzani et al., "Winner-take-all autoencoders, in Advances in Neural Information Processing Systems", pp. 2791-2799 (2014).
B. Neyshabura et al., "One symmetric and asymmetric LSHS for inner product search" arXiv preprint arXiv:1410.5518 (2014).
Shrivastava, A., "Optimal densification for fast and accurate minwise hashing. arXiv preprint arXiv: 1703.04664" (2017).
Hong-Jun Yoon et al., "Filter pruning of Convolutional Neural Networks for text classification: A case study of cancer pathology report comprehension" (2014).
Qiangui HUANG et al., "Learning to Prune Filters in Convolutional Neural Networks" (2018).
Hao Li et al., "Pruning Filters for Efficient ConvNets", (2017).

\* cited by examiner

METHOD OF OPTIMIZATION OF OPERATING A CONVOLUTIONAL NEURAL NETWORK AND SYSTEM THEREOF

TECHNICAL FIELD

The presently disclosed subject matter relates, in general, to the field of neural networks, and more specifically, to methods and systems for optimization of operating a Convolutional Neural Network (CNN).

BACKGROUND

Deep neural networks have been shown to be a powerful technique for tackling challenges in many aspects, including object classification and detection. With recent rapid development of neural network technologies, the models are getting more complex and time-consuming. The cost of computing inferences increases with the number of parameters and convolution operations involved. These computational costs are particularly relevant when dealing with real-world applications deployed on low cost and low power edge devices, such as, e.g., smartphones, security cameras, connected home appliances, autonomous vehicles and Robots, IoT sensors and IoT gateways, etc., where computational and power resources are limited, while high responsiveness and low latency are needed.

The major challenge in enabling Artificial Intelligence computing for widespread deployment on various devices and applications, is the high computational, memory and power requirements of these networks. Thus there is a need for new neural network architectures designed for computational cost efficiency, while achieving the required precision.

GENERAL DESCRIPTION

In accordance with certain aspects of the presently disclosed subject matter, there is provided a computerized method of optimization of operating a Convolutional Neural Network (CNN), the CNN comprising a plurality of layers each including one or more filters, the method comprising: for each given layer of the plurality of layers: i) obtaining at least one input feature map; ii) retrieving an index of the one or more filters in the given layer, wherein the index is query-able using maximum inner product search; and iii) generating one or more output feature maps corresponding to the one or more filters based on the at least one input feature map, wherein each of the at least one input feature map includes a plurality of blocks, the generating comprising: for each given block of the plurality of blocks, querying the index to find a number of selected filters meeting a predetermined criterion related to respective inner products between the selected filters and the given block; and applying the number of selected filters on the given block to obtain a number of output values for a given output position in a number of output feature maps corresponding to the number of selected filters, the given output position corresponding to the position of the given block, and filling in the given output position in the rest of output feature maps with a value of zero, thereby reducing computational cost of operating the CNN, as compared to computational cost of having applied all of the one or more filters on the given block.

In addition to the above features, the method according to this aspect of the presently disclosed subject matter can comprise one or more of features (i) to (xiii) listed below, in any desired combination or permutation which is technically possible:

(i). The CNN can be pre-trained such that the one or more output feature maps in at least some of the plurality of layers have a given level of sparsity. The predetermined criteria can be determined with respect to the given level of sparsity.

(ii). Each layer of the CNN can be pre-trained by zeroing weak activations in one or more output feature maps in the at least some of the plurality of layers.

(iii). The index can be generated using an indexing algorithm thereby enabling the index to be query-able using maximum inner product search.

(iv). The indexing algorithm can be a Locality-sensitive hashing (LSH) algorithm.

(v). The indexing algorithm can be a clustering algorithm.

(vi). The indexing algorithm can include transforming the filters to specific representations and sorting the specific representations to form the index. The generating can further comprise, for each given block, performing the transformation on the given block giving rise to a corresponding representation and querying the index using the corresponding representation.

(vii). The at least one input feature map can comprise a plurality of input feature maps corresponding to a plurality of channels, and generating one or more output feature maps can be performed for each of the input feature maps.

(viii). The method can further comprise generating a prediction map including, for each given block: a spatial position of the given block, the number of selected filters thereof, and a given channel of an input feature map where the given block locates, and wherein the prediction map is used, to apply the selected filters on the spatial position in the given channel.

(ix). The method can further comprise creating a sparsity map corresponding to an output feature map using the prediction map, the sparsity map being indicative of a list of non-zero positions in the output feature map.

(x). The plurality of blocks can be obtained by using a sliding window on the at least one input feature map with a predefined step size.

(xi). The plurality of blocks can be obtained as corresponding to a list of non-zero positions on the at least one input feature map, the list of non-zero positions being obtained based on at least one sparsity map from a previous layer.

(xii). The method can further comprise filling in positions in the output feature maps corresponding to zero-positions in the at least one input feature map with a value of zero.

(xiii). The method can further comprise repeating the steps i)-iii) for each layer of the plurality of layers of CNN, wherein the one or more output feature maps of a previous layer serve as the at least one input feature map of a current layer.

In accordance with other aspects of the presently disclosed subject matter, there is provided a computerized system of optimization of operating a Convolutional Neural Network (CNN), the CNN comprising a plurality of layers each including one or more filters, the system comprising a processing and memory circuitry (PMC) configured to: for each given layer of the plurality of layers: i) obtain at least one input feature map; ii) retrieve an index of the one or more filters in the given layer, wherein the index is query-able using maximum inner product search; and iii) generate one or more output feature maps corresponding to the one or more filters based on the at least one input feature map, each of the at least one input feature maps including a plurality of blocks, wherein the PMC is configured to generate the one or more output feature maps by: for each given block of the plurality of blocks, querying the index to find a number of selected filters meeting a predetermined criteria related to respective inner products between the selected filters and the given block; and applying the number of selected filters on the given block to obtain a number of output values for a given output position in a number of output feature maps corresponding to the number of selected filters, the given output position corresponding to the position of the given block, and filling in the given output position in the rest of output feature maps with a value of zero, thereby reducing computational cost of operating the CNN as compared to computational cost of having applied all of the one or more filters on the given block.

This aspect of the disclosed subject matter can comprise one or more of features (i) to (xiii) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of optimization of operating a Convolutional Neural Network (CNN), the CNN comprising a plurality of layers each including one or more filters, the method comprising: for each given layer of the plurality of layers: i) obtaining at least one input feature map; ii) retrieving an index of the one or more filters in the given layer, wherein the index is query-able using maximum inner product search; and iii) generating one or more output feature maps corresponding to the one or more filters based on the at least one input feature map, wherein each of the at least one input feature map includes a plurality of blocks, the generating comprising: for each given block of the plurality of blocks, querying the index to find a number of selected filters meeting a predetermined criteria related to respective inner products between the selected filters and the given block; and applying the number of selected filters on the given block to obtain a number of output values for a given output position in a number of output feature maps corresponding to the number of selected filters, the given output position corresponding to the position of the given block, and filling in the given output position in the rest of output feature maps with a value of zero, thereby reducing the computational cost of operating the CNN as compared to computational cost of having applied all of the one or more filters on the given block.

This aspect of the disclosed subject matter can comprise one or more of features (i) to (xiii) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
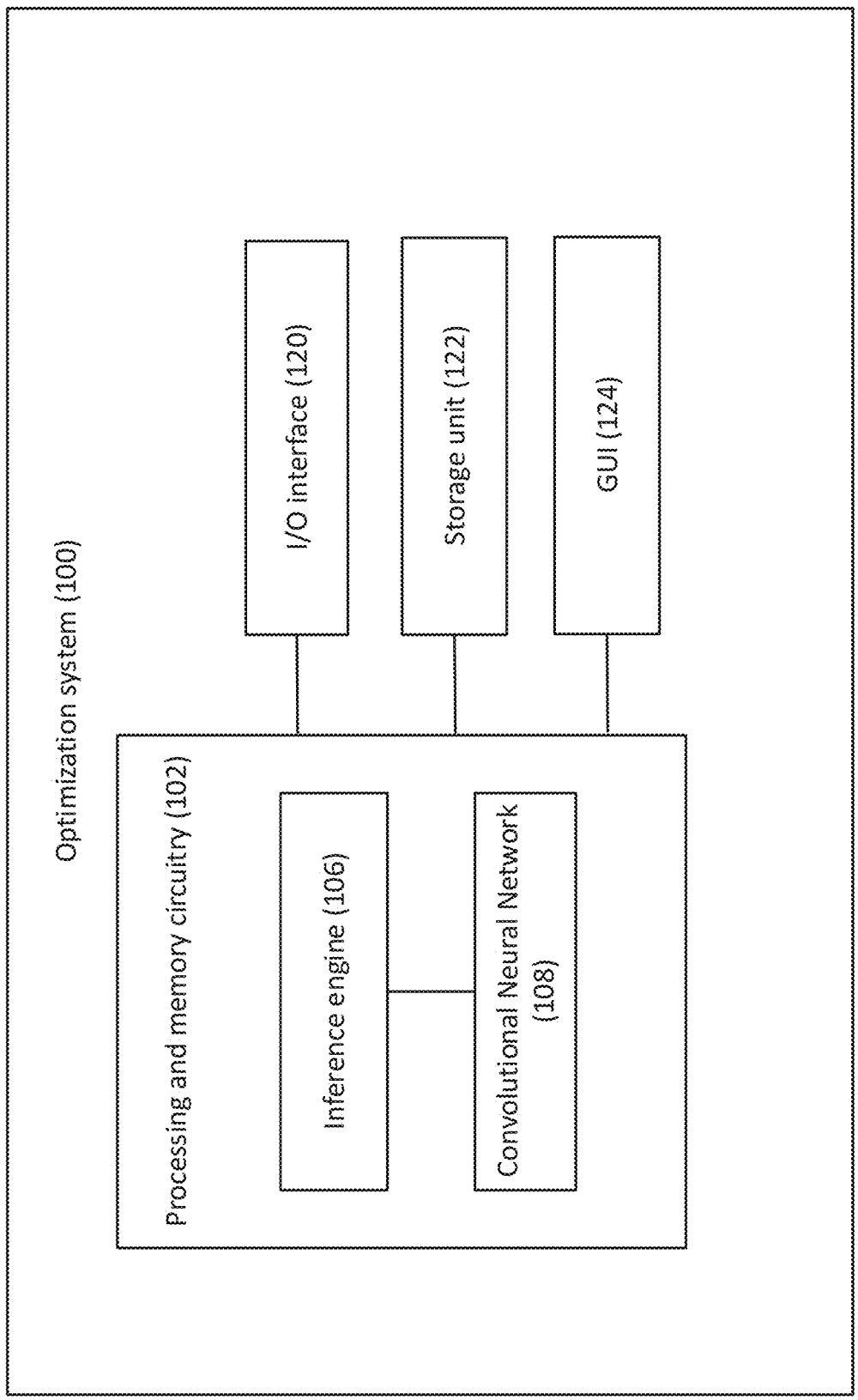
FIG. 1 schematically illustrates a block diagram of a computerized system of optimization of operating a Convolutional Neural Network in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "operating", "receiving", "generating", "retrieving", "querying", "applying", "filtering", "reducing", "zeroing", "using", "enabling", "indexing", "clustering", "transforming", "sorting", "creating", "filling", "repeating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of optimization of operating a Convolutional Neural Network (CNN) and the processing and memory circuitry (PMC) thereof disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In certain embodiments of the presently disclosed subject matter, one or more stages may be executed in a different order and/or one or more groups of stages may be executed simultaneously and vice versa.

Bearing this in mind, attention is drawn to FIG. 1, schematically illustrating a block diagram of a computerized system of optimization of operating a Convolutional Neural Network in accordance with certain embodiments of the presently disclosed subject matter.

The system 110 illustrated in FIG. 1 is a computer-based system capable of optimizing operations of a Convolutional Neural Network (CNN). CNN is a class of deep artificial neural networks which are extensively used in image and video recognition, natural language processing, and other machine learning processes. A CNN comprises a plurality of layers, each transforming one volume of activations to another through a differentiable function. It is to be noted that a CNN can typically comprise different types of layers, such as, e.g., convolutional layers, pooling layers, fully connected layers and normalization layers, and the layers described in the present disclosure refer to the convolutional layers which are the core components of the CNN and perform most of the computation operations involved in the CNN. Convolutional layers apply a convolution operation to the input, passing the result to the next layer.

Each layer's parameters can comprise a set of filters (also termed as kernels, or weight vectors), which have a relatively small receptive field, but extend through the full depth of the input volume. Each filter can be indicative of certain specific features to be detected in the input volume through the convolution. Input volume refers to a multi-dimensional input for a given layer. In some cases, the input to a given layer can comprise one or more input feature maps corresponding to one or more channels of the input. For example, the input to a first layer of a CNN can be an input image having multiple color channels, e.g., three channels R, G and B as in the RGB color model. In such cases, the input or input volume for the first layer can be regarded as comprising three input feature maps, each corresponding to a respective channel. It is to be noted that an input feature map can be in any suitable form of data structures (e.g., vectors, matrix, etc.) that can be indicative of features represented therein and their associated locations, and the present disclosure is not limited by a specific form of implementation thereof.

During the forward pass, each filter is convolved across the width and height of the input volume, computing the dot product between the entries of the filter and the input and producing a two-dimensional activation map which gives the responses of that filter at every spatial position. As a result, the network learns of filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map.

Figure 5:
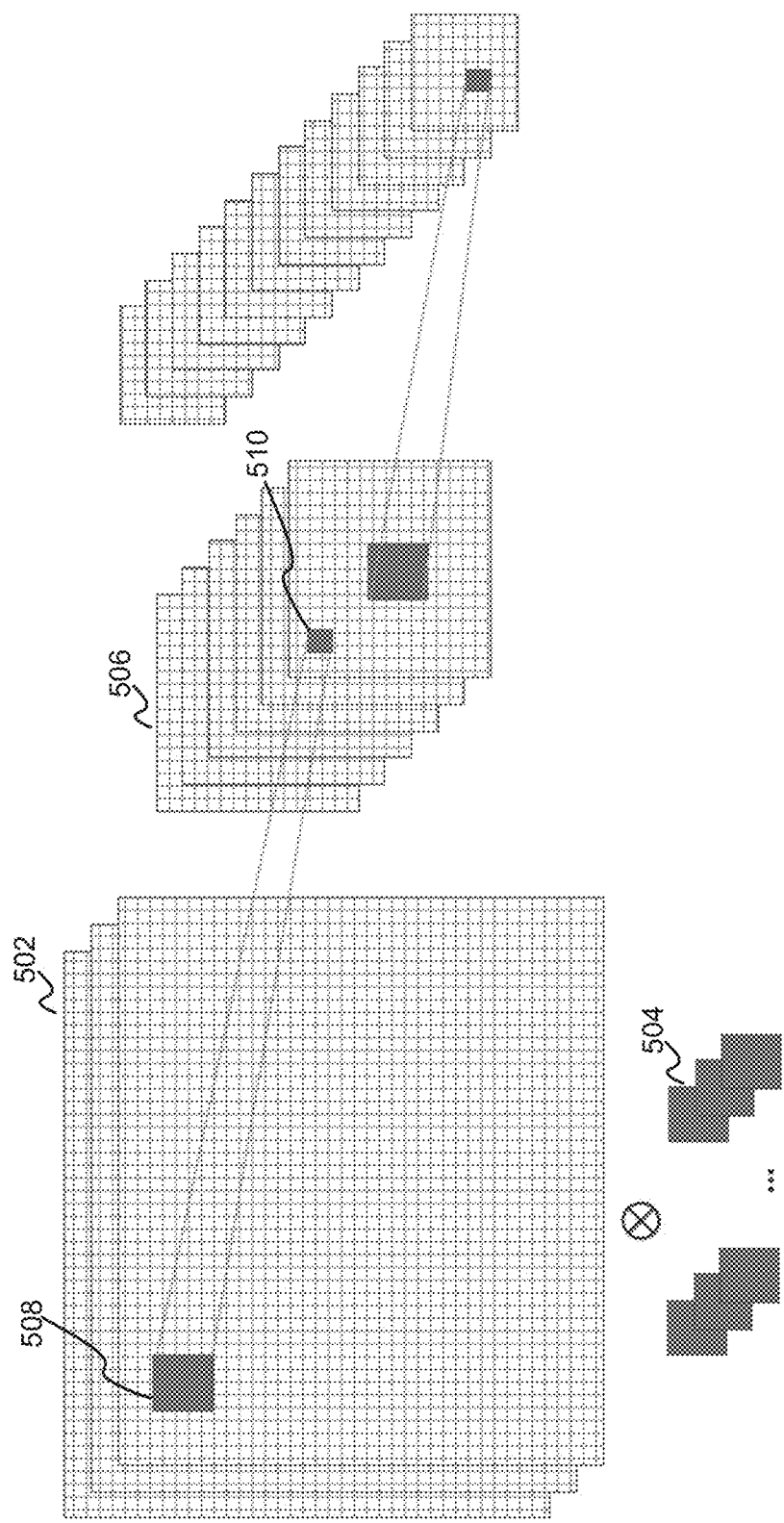
FIG. 5 is schematic illustration of an exemplary partial CNN architecture in accordance with certain embodiments of the presently disclosed subject matter.

Referring now to FIG. 5, this is a schematic illustration of an exemplary partial CNN architecture in accordance with certain embodiments of the presently disclosed subject matter.

As shown, there is exemplified an input 502 provided to a first layer of the CNN. The input 502 comprises three input feature maps corresponding to three channels thereof (e.g., the R, G and B channels as described above). The first layer is exemplified to comprise multiple filters 504 each extending through the full depth of the input 502. For example, a filter 504 can have a size of 5×5×3 (i.e. 5 pixels in width and height, and 3 in depth since the input has a depth of 3). Such a filter can also be regarded as comprising three filter components depth-wise. Each filter is slid across the width and height of the input (i.e., each filter component applied on a corresponding input feature map) and dot products are computed between the entries of the filter and the input at any position, giving rise to an activation map corresponding to the respective filter. All the activation maps for all filters are stacked along the depth dimension forming the full output volume 506 of the first layer. The activation map is thus also referred to as an output feature map. The number of output feature maps as comprised in the output 506 should correspond (e.g., be equivalent) to the number of filters 504 in the given layer. The output 506 serves as the input for the next layer.

Thus it can be recognized that as the CNN grows deeper (i.e., involves progressively more layers, and/or uses more filters per layer), the number of convolution operations involved increases tremendously, which, in turn, affects the computational cost, storage and power consumption of computing inferences using the CNN. The present disclosure can be used to optimize or accelerate operation of a CNN, thereby achieving computational cost and power consumption efficiency, while not compromising the level of accuracy.

Referring back to FIG. 1, system 100 can comprise a processing and memory circuitry (PMC) 102 operatively connected to a hardware-based I/O interface 120 and a storage unit 122. PMC 102 is configured to provide all processing necessary for operating system 100 which is further detailed with reference to FIGS. 2-4. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein should be expansively construed to cover any processing circuitry with data processing capabilities, and the present disclosure is not limited to the type or platform thereof, or number of processing cores comprised therein.

In certain embodiments, functional modules comprised in the PMC 102 can comprise an inference engine 106 and a CNN module 108. The functional modules comprised in the PMC are operatively connected with each other.

Since CNN is a feed-forward neural network which receives an input and transforms it sequentially through a series of layers, the presently disclosed optimization method as encompassed in system 100 can be applied repetitively for performing each layer's operations. Assuming the CNN comprises a plurality of layers each including one or more filters, for each given layer of the plurality of layers, the PMC 102 can be configured to obtain an input comprising at least one input feature map.

The PMC 102 can be further configured to retrieve an index of the one or more filters in the given layer. The index is generated in such a way that it is query-able using a maximum inner product search, as described in further detail below with respect to FIGS. 2 and 3. The inference engine 106 can be configured to generate one or more output feature maps corresponding to the one or more filters based on the at least one input feature map. The term inference refers to the stage when a trained neural network (e.g., the CNN module 108) is put into operation in runtime for inferring or predicting facts about new data it is presented with, based on its training. Inference engine refers to a computerized component configured to control the CNN's operations in the inference stage, e.g., it applies the trained network and rules to the new data to deduce information. Specifically, each of the at least one input feature map can include a plurality of blocks, and the inference engine 106 can be configured to, for each given block of the plurality of blocks, query the index to find a number of selected filters meeting a predetermined criterion related to respective inner products between the selected filters and the given block, and apply the number of selected filters on the given block to obtain a number of output values for a given output position in a number of output feature maps corresponding to the number of selected filters. The given output position corresponds to the position of the given block. The output position in the rest of output feature maps can be filled in with a value of zero.

The proposed optimization mechanism in the presently disclosed subject matter can effectively reduce computational cost of CNN operations as compared to the original computational cost of CNN not utilizing the optimization mechanism (i.e., had all the filters been applied on each given block). This is achieved at least by using a specific index to identify selected filters and only applying the selected filters on each given block, instead of applying all the filters, thereby saving the computational cost of running the convolution operations between the unselected filters and each given block as originally needed. Details on this aspect are described below with reference to FIGS. 2-4.

The CNN module 108 as comprised in the PMC 102 refers to a trained CNN that is ready to be used for inference. The CNN 108 can be regarded as comprising a plurality of layers each including one or more filters. In some embodiments, the CNN is trained to be a sparse CNN. In some cases, the CNN is trained in such a way that the one or more output feature maps in each given layer have a given level of sparsity, as described below in further detail with reference to FIGS. 2 and 4.

In some embodiments, the storage unit 122 can be configured to store necessary inputs and outputs, as well as intermediate processing results, such as, e.g., the input feature maps, the index, and/or the output feature maps, etc. The input can be pre-acquired and stored in the storage unit which can be retrieved by the PMC. It is to be noted that although the storage unit is illustrated in FIG. 1 as being comprised in system 100, this is for purpose of illustration only and should not be deemed as limiting the present disclosure in any way. In some cases, the storage unit can reside external to system 100, e.g., in certain external data repositories, or in an external system or provider, and the input can be retrieved via the I/O interface 120.

Optionally, system 100 can further comprise a graphical user interface (GUI) 124 configured to render display of the input and/or the output to the user. For instance, the input and/or output of the CNN can be displayed to the user via the GUI. Optionally, the GUI can be configured to enable user-specified inputs for operating system 100.

The system 100 can be used for optimizing operations of CNN for various purposes and applications, such as, e.g., object classification, image recognition, style transfer (i.e., recomposing images in the style of other images), High dynamic range (HDR) imaging, Natural language processing (NLP), Pose Estimation, and Sentiment analysis and detection, etc. It is to be appreciated that the present disclosure is not limited by any specific usage and application of the system.

It is also noted that the system illustrated in FIG. 1 can be implemented in a distributed computing environment, in which the aforementioned functional modules comprised therein can be distributed over several local and/or remote devices, and can be linked through a communication network.

Those versed in the art will readily appreciate that the teachings of the presently disclosed subject matter are not bound by the systems illustrated in FIG. 1; equivalent and/or modified functionality can be consolidated or divided in another manner and can be implemented in any appropriate combination of software with firmware and hardware. The system in FIG. 1 can be standalone network entities, or integrated, fully or partly, with other network entities. Those skilled in the art will also readily appreciate that the database therein can be shared with other systems or be provided by other systems, including third party equipment.

Figure 2:
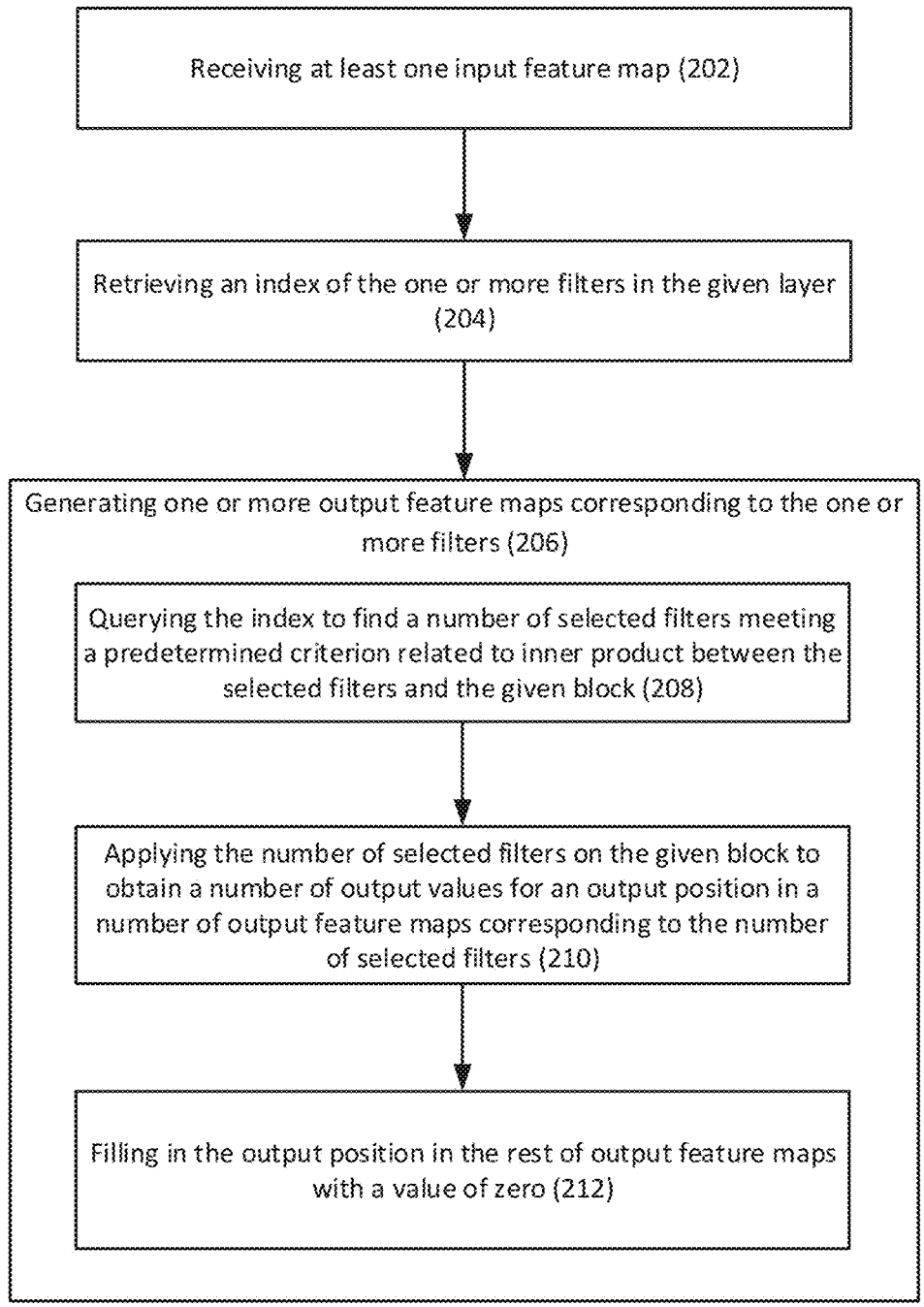
FIG. 2 illustrates a generalized flowchart of operating a Convolutional Neural Network (CNN) in accordance with certain embodiments of the presently disclosed subject matter.
Figure 3:
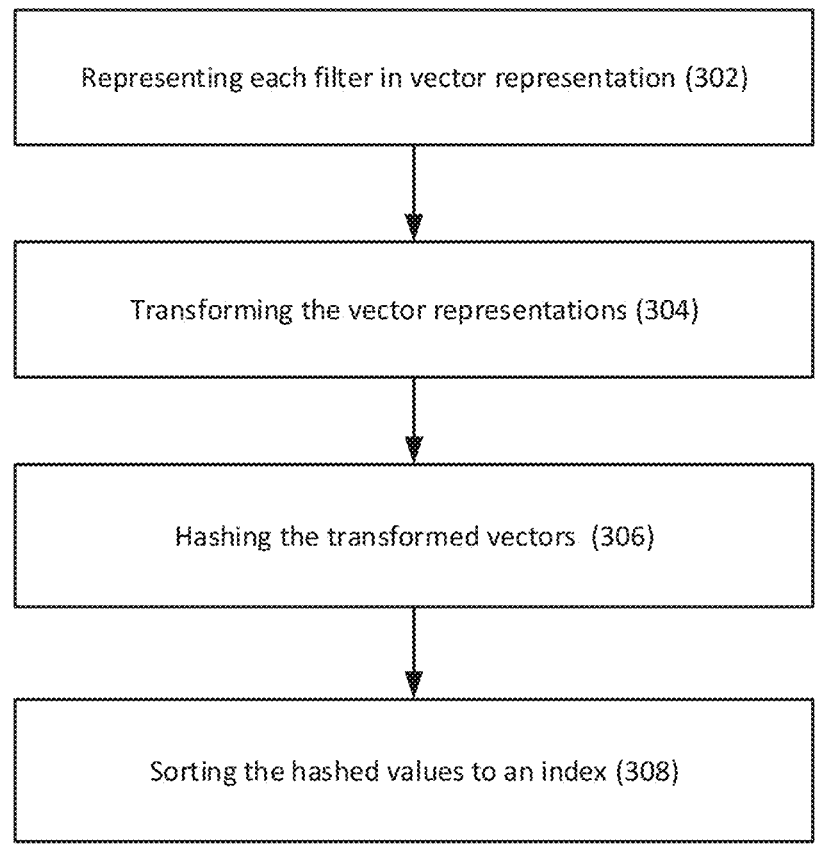
FIG. 3 illustrates a generalized flowchart of generating an index query-able using a maximum inner product search in accordance with certain embodiments of the presently disclosed subject matter.
Figure 4:
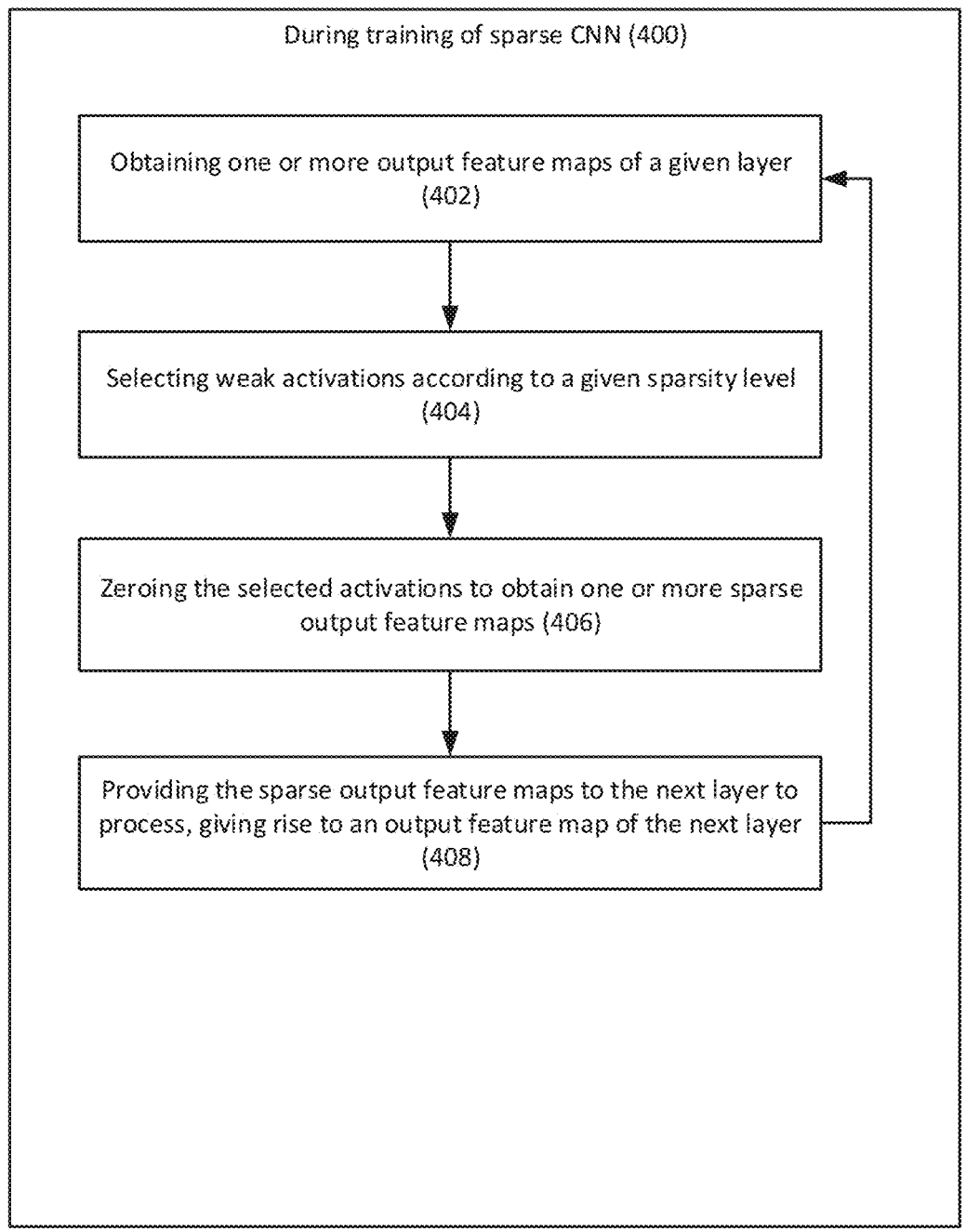
FIG. 4 illustrates a generalized flowchart of training a sparse CNN in accordance with certain embodiments of the presently disclosed subject matter.

While not necessarily so, the process of operation of system 100 can respectively correspond to some or all of the stages of the methods described with respect to FIGS. 2-4. Likewise, the methods described with respect to FIGS. 2-4 and their possible implementations can be respectively implemented by system 100. It is therefore noted that embodiments discussed in relation to the methods described with respect to FIGS. 2-4 can also be implemented, mutatis mutandis as various embodiments of the system 100, and vice versa.

Referring now to FIG. 2, there is illustrated a generalized flowchart of operating the Convolutional Neural Network (CNN) in accordance with certain embodiments of the presently disclosed subject matter.

The CNN referred to herein comprises a plurality of layers each including one or more filters. The operations described below with reference to FIG. 2 are performed for each given layer of the plurality of layers. In some embodiments, a trained CNN has a certain level of sparsity. By way of example, the sparsity of a trained CNN can be reflected in that one or more output feature maps in at least some layers of the CNN are sparse, i.e., the activations in the output feature maps are sparse (most values are zero). In some cases, the CNN is trained in such a way that one or more output feature maps in certain given layers have a given level of sparsity. For instance, an output feature map having a sparsity of 90% means that the activations (i.e., the non-zero values) in the output feature map only take up 10% of the feature map. Various methods can be used to train a CNN to be sparse. In one embodiment, a CNN can be trained to have a level of sparsity by controlling the training process so as to be able to zero weak activations in one or more output feature maps in at least some of the plurality of layers.

Referring now to FIG. 4, there is illustrated a generalized flowchart of training a sparse CNN in accordance with certain embodiments of the presently disclosed subject matter.

During the forward pass in a training phase, for each of at least some of the plurality of layers, upon obtaining (402) the one or more output feature maps, weak activations in the output feature maps can be selected (404) according to the given level of sparsity as required. Weak activations refer to activations that have values relatively closer to zero. The selected weak activations are zeroed (406) to obtain one or more sparse output feature maps. The sparse output feature maps are then provided (408) to the next layer as input so as to generate the output feature maps of the next layer. The process then returns to block 402, until the current layer is the last layer.

A non-limiting example of training sparse neural networks is described in Ba, J. and Frey, B., 2013, entitled Adaptive dropout for training deep neural networks, in Advances in Neural Information Processing Systems, pages. 3084-3092, which is incorporated herein in its entirety by reference. Another non-limiting example of training sparse neural network is described in Makhzani, A. and Frey, B. J., 2015, entitled Winner-take-all autoencoders, in Advances in Neural Information Processing Systems, pages. 2791-2799, which is incorporated herein in its entirety by reference.

Continuing with the description of FIG. 2, for each given layer, an input comprising at least one input feature map can be obtained (202) (e.g., by the PMC 102 via I/O interface 120, or from the storage unit 122, as illustrated in FIG. 1). Specifically, for the input of the first layer, the at least one feature map can be obtained/retrieved from any internal or external storage devices, such as, e.g., a local storage unit 122, or certain external data repositories operatively connected to system 100. The output of a given layer is then provided as input to the next layer. It is to be noted that the input or input feature maps referred to herein can represent any type and/or form of data objects (e.g., including but not limited to images), and the input feature maps can be in any suitable form of data structures (e.g., vectors, matrix, etc.) that can be indicative of features represented therein and their associated locations. The present disclosure is not limited to a specific type of representation of the input, nor a specific form of data structure implementation thereof. By way of example, when an input feature map represents an input image, it can be in the form of a pixel map. In some cases, the input image can have different color channels, e.g., R, G and B channels, and there can be three input feature maps corresponding to respective color channels.

An index of the one or more filters in the given layer can be retrieved (204) (e.g., by the PMC 102 via I/O interface 120, or from the storage unit 122, as illustrated in FIG. 1). The index is query-able using a maximum inner product search. An inner product is a generalization of a dot product. In a vector space, it refers to a scalar function of two vectors, equal to the product of their magnitudes and the cosine of the angle between them. In particular, in Euclidean geometry, the inner product of two vectors is also referred to as a dot product of the two vectors, i.e., the sum of the products of the corresponding entries of the two vectors. Inner product search, or maximum inner product search, as used herein, refers to a search that, for a given user vector, performs a dot product of the user vector with all the candidate vectors, and selects a number of candidate vectors (e.g., top K out of all N candidate vectors) with maximum dot product. In this way, the inner product search relates to nearest neighbor search, which finds the point in a given set that is closest (or mostly similar) to a given point, only that, in this specific case, the closeness or similarity is defined in terms of an inner product similarity measure.

It is proposed in the present disclosure to use the inner product search for the purpose of selecting, for each given block in an input feature map, a number of filters, out of all the filters in a given layer of a CNN, which, when applied to the given block, will be able to generate an output that has a similar level of accuracy in terms of prediction. The selected filters are in fact the filters that will give the highest activation for a given block in the input feature map. In order to be able to use the inner product search for such selection, it is needed to arrange/sort the filters of a given layer in such a way (i.e., an index) that they are searchable using an inner product search. An index (of the filters) refers to a data structure configured for quick data retrieval operations, i.e., it can be used to quickly locate data (e.g., filters) without having to search every item. In some embodiments of the presently disclosed subject matter, the filters of a given layer can be indexed using an indexing algorithm thereby enabling the index to be query-able using a maximum inner product search. There are various ways for generating an index that enables carrying out an inner product search. In some embodiments, the indexing algorithm can include transforming the filters to specific representations and sorting the specific representations to form the index. By way of example, the indexing algorithm can be a Locality-sensitive hashing (LSH) algorithm. By way of another example, the indexing algorithm can be a clustering algorithm. In some embodiments, the index is generated prior to the inference stage of the CNN. For instance, once the CNN is trained, the filters of each layer in the CNN are determined. Thus an index can be generated for the filers in each given layer, and the pre-generated index can be stored in association with the filters and can be retrieved during the inference stage.

Referring now to FIG. 3, there is illustrated a generalized flowchart of generating an index query-able using a maximum inner product search in accordance with certain embodiments of the presently disclosed subject matter.

Each filter in a given layer can be represented (302) as a vector representation (also referred to as a vector). In some cases, the vector representations can be transformed (304) so that the inner product of the transformed vectors can be easily derived. The vectors or the transformed vectors can be then hashed (306) and the hashed values are sorted (308) to generate an index. Various hashing algorithms can be used for hashing the vectors, and one example that can be used is a Locality-sensitive hashing (LSH) algorithm. LSH can reduce the dimensionality of high-dimensional data and can hash items so that similar items can map to the same "buckets" with high probability. There are different schemes of implementing an LSH, such as, e.g., random projection, Min-Hash (also termed as minwise hashing), etc. In particular, Min-Hash can be used to implement one permutation hashing that can be used to quickly estimate how similar two vectors are (in terms of inner product similarity), as compared to other types of hashing methods which typically require a large number of permutations. A non-limiting example of using Min-hash to generate an index is illustrated in Shrivastava, A., 2017: Optimal densification for fast and accurate minwise hashing. arXiv preprint arXiv: 1703.04664, which is incorporated herein in its entirety by reference. One example of using LSH to perform inner product search is described in Neyshabur, B. and Srebro, N., 2014, entitled One symmetric and asymmetric LSHS for inner product search, in arXiv preprint arXiv:1410.5518, which is incorporated herein in its entirety by reference.

In some embodiments, clustering algorithms can be used for generating the index. By way of example, a top-down spherical k-means clustering algorithm can be used for sorting the filters such that a tree search can be used for querying the index. A non-limiting example of using clustering to generate an index for inner product search is described in Auvolat, A., Chandar, S., Vincent, P., Larochelle, H. and Bengio, Y., 2015, entitled Clustering is efficient for approximate maximum inner product search, in arXiv preprint arXiv:1507.05910.

Figure 6:
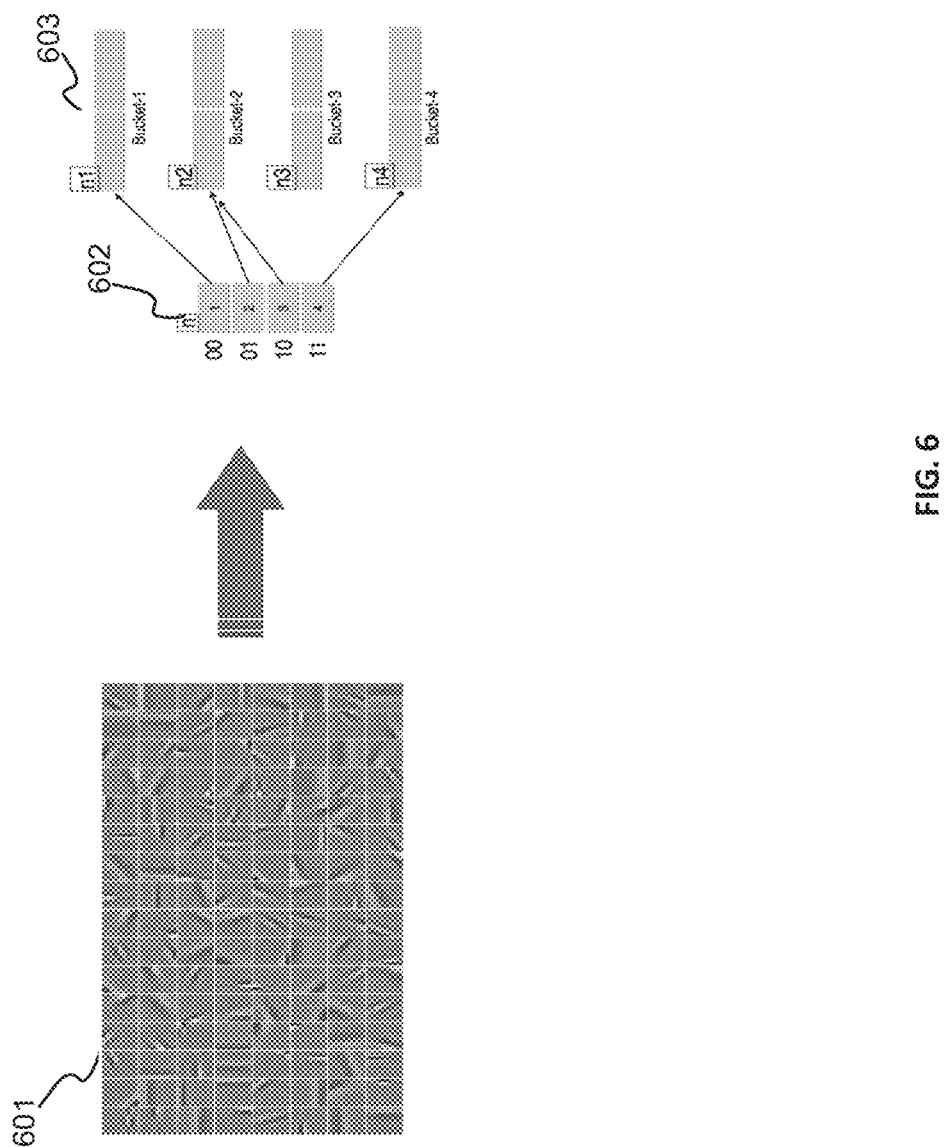
FIG. 6 is a schematic illustration of an exemplified index generated for a set of filters in accordance with certain embodiments of the presently disclosed subject matter.

FIG. 6 illustrates a schematic illustration of an exemplified index generated for a set of filters in accordance with certain embodiments of the presently disclosed subject matter. As shown, there are illustrated a set of filters 601 of a given layer of a trained CNN. The filters 601 in this example are indicative of different grayscale visual features to be detected in a given input feature map. Upon applying an indexing algorithm (as described above) to the filters 601, the filters can be represented in hash values 602 and the hashed values can be sorted/binned into different buckets 603. The sorted and binned hash values constitute the index of the filters 601.

Referring back to FIG. 2, one or more output feature maps corresponding to the one or more filters can be generated (206) (e.g., by the inference engine 106 in PMC 102) based on the at least one input feature map. Specifically, each of the at least one input feature maps can include a plurality of blocks, and the generation of output feature maps can comprise: for each given block of the plurality of blocks, querying (208) the index to find a number of selected filters meeting a predetermined criterion related to the respective inner products between the selected filters and the given block, applying (210) the number of selected filters on the given block to obtain a number of output values for a given output position in a number of output feature maps corresponding to the number of selected filters, and filling in (212) the given output position in the rest of output feature maps with a value of zero.

In some embodiments, the plurality of blocks as comprised in the input feature map can be blocks of pixels, which may have any suitable size. The blocks can be obtained by using a sliding window. The sliding window can have a predefined size and can be configured to "slide" through the input feature map with a certain step size (e.g., the distance that the sliding window moves per "slide" step). The step size can be defined so that the blocks are either not overlapped with each other, or overlapped in a specific way. By way of example, each block can include a set of pixels that is not the same as the set of pixels of any other block (i.e., no two of the blocks completely overlap in pixel space). By way of another example, the blocks may be mutually exclusive of each other (i.e., the blocks are non-overlapping tiles in the input feature map). Furthermore, the blocks may include a combination of 1) some blocks that are mutually exclusive of all other blocks in the image, and 2) some blocks that overlap with other blocks to some degree. The blocks may also not extend across the entirety of the input feature map. In this manner, some of the pixels in the input feature map may not be included in any of the blocks. The present disclosure is not limited to any specific way to divide the input feature map and obtain the blocks.

For each given block of the plurality of blocks in each input feature map, the index as described above with reference to FIGS. 3 and 6 can be queried to find a number of selected filters meeting a predetermined criterion. The predetermined criterion can relate to inner products between the selected filters and the given block. By way of example, the predetermined criterion can be selecting top K (e.g., K is a predefined number) filters out of all the filters in the given layer where the K filters provide maximum inner product results with the given block. By way of another example, the predetermined criterion can be selecting the filters whose inner product results with the given block pass a given threshold. By way of further example, the predetermined criterion can be a combination of both a predefined number of filters to be selected, and a given threshold. In some embodiments, before querying the index for each given block, a transformation (i.e., the transformation that was used to transform the filters to specific representations to be sorted for forming the index) needs to be performed on the given block, giving rise to a corresponding representation, and the index can be queried using the corresponding representation of the given block. In some cases, the indexing algorithm is selected so as to minimize the computational cost for performing the transformation of each block in runtime (such as, e.g., by using Min-Hash as described above).

According to certain embodiments, in cases where the CNN is trained to have a given level of sparsity, as described above, the predetermined criterion can be determined with respect to the given level of sparsity. By way of example, the predefined number of filters to be selected and/or the given threshold can be determined according to the level of sparsity of the CNN. For instance, when the output feature maps of a given layer have a relatively high sparsity level (e.g., a sparsity of 90%), this means the activations in the output feature maps are rare and most likely to be local. In such cases, the selected filters can be a relatively small percentage of the total number of filters, and the threshold related to the inner product results can be set as a relatively high limit, which can still guarantee that the selected filters can sufficiently capture the activations, thereby retaining the same level of accuracy while efficiently reducing the computational cost to a small percentage of the original cost.

Figure 7:
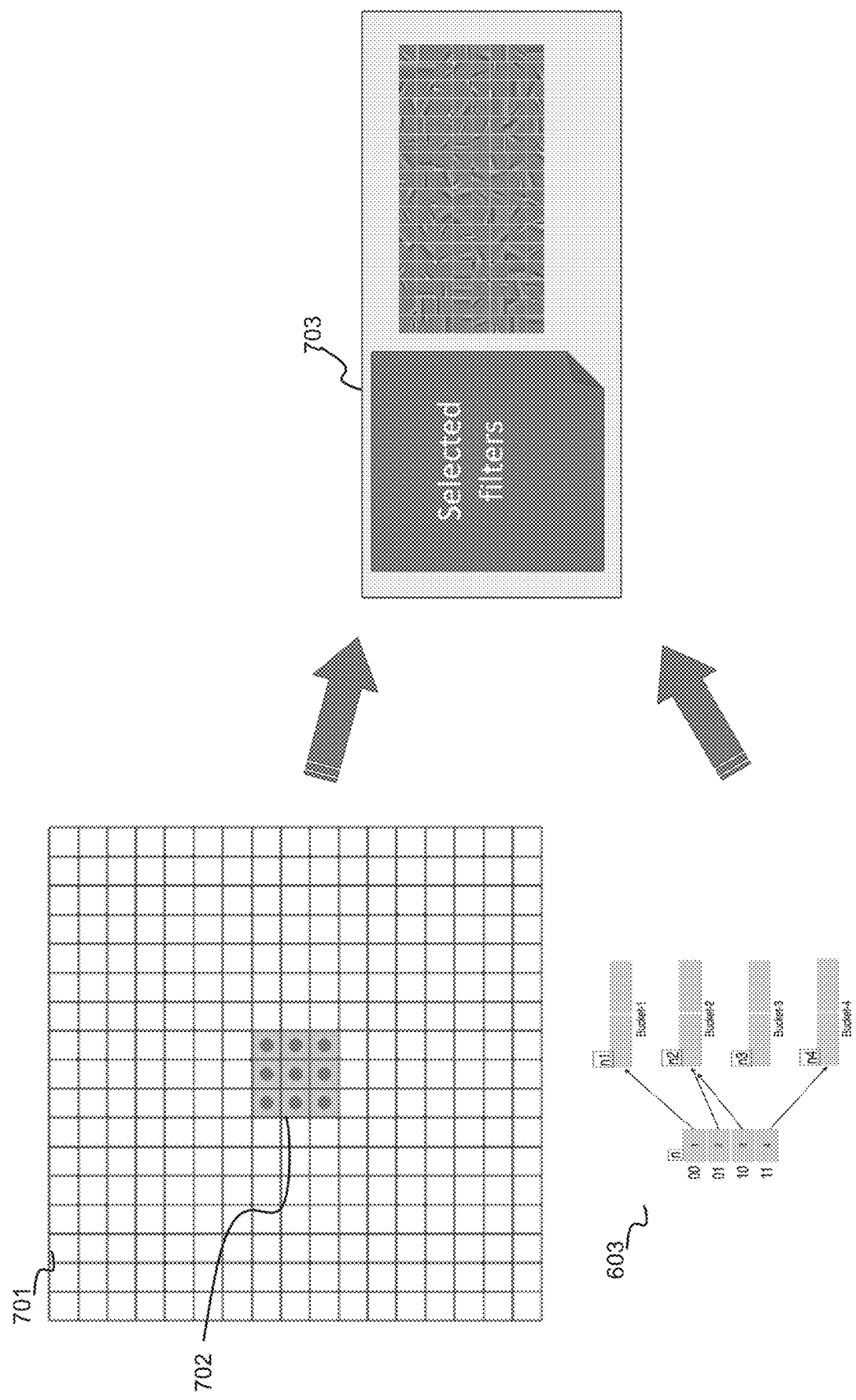
FIG. 7 is a schematic illustration of querying the index to select filters in accordance with certain embodiments of the presently disclosed subject matter.

Referring now to FIG. 7, this is a schematic illustration of querying the index to select filters in accordance with certain embodiments of the presently disclosed subject matter.

There are shown an exemplified input feature map 701 and a given block 702 comprised therein. It is to be noted that the block 702 is illustrated as one example of a plurality of blocks that are comprised in the input feature map and the position of the block 702 is for illustrative and exemplary purposes only. For the given block 702, the index 603 of the filters in the given layer, as previously described with reference to FIG. 6, can be queried and a number of selected filters 703 can be identified. The operation of querying the index to find selected filters is performed repetitively for each block of the plurality of blocks, giving rise to respective selected filters corresponding to the plurality of blocks.

Once the number of selected filters for the given block are found, the selected filters can be applied on the given block (i.e., by performing convolution between each of the filters and the given block), thereby obtaining a number of output values corresponding to the number of selected filters. The number of output values are for a given output position in a number of output feature maps corresponding to the number of selected filters. The given output position is a position in the output feature maps that corresponds to the position of the given block in the input feature map. As exemplified in FIG. 5, a given block 508 in the input feature maps of the input 502 corresponds to an output position 510 in the output feature maps of the output 506. As aforementioned, for each given filter, there will be generated a corresponding output feature map. Therefore, for the output feature maps that correspond to the selected filters, the value for the given output position is obtained through the convolution. For the rest of the output feature maps that correspond to the unselected filters, the value for the given output position is filled in with zero.

Continuing with the example of FIG. 5, assume the multiple filters 504 comprise six filters corresponding to the six output feature maps as shown in the output 506. Also, assume filters 1 and 4 are selected as the number of selected filters for the given block 508. Thus in the corresponding output feature maps 1 and 4, the output position 510 is filled in with the output value which resulted from the convolution between the respective filters and the given block, and in the rest of output feature maps, namely, in output feature maps 2, 3, 5 and 6, the output position 510 will be filled in with a value of zero. In such a way, the computational cost for the convolution operations between the unselected filters and the given block are saved, thus significantly improving computation efficiency (e.g., in the present example the computation cost can be saved by at least ⅔ of the original cost).

According to certain embodiments, in some cases, a prediction map can be generated for performing the convolution operations. The prediction map can include, for each given block of the plurality of blocks: a spatial position of the given block, a number of selected filters thereof, and a given channel of an input feature map where the given block locates. The prediction map can be used to apply the selected filters on the spatial position in the given channel. Thus in some cases, it is possible to first perform the querying of the index for all the blocks, i.e., sequentially querying the index for each given block, and then generate a prediction map associated with the given block. Once the query is performed for all the plurality of blocks, the convolution operations can be performed by applying respective prediction maps with respect to the associated given blocks. In some other cases, it is also possible to perform the query for each block followed by performing the corresponding convolution operation using the generated prediction map, and then move on to the next query and corresponding convolution operations. It is to be noted that the operations related to the querying index and applying selected filters as described with reference to blocks 208 and 210 can be performed in any suitable order and/or combination concurrently or sequentially as allowed by the computation capability of the PMC 102, and the present disclosure is not limited by the specific implementation thereof.

In some embodiments, a sparsity map corresponding to an output feature map can be created using the prediction map. The sparsity map can be indicative of a list of non-zero positions (i.e., locations of activations) in the output feature map. The sparsity map can be used by the next layer as described below.

According to certain embodiments, in cases where the CNN is trained to have a given level of sparsity, as described above, the plurality of blocks can be obtained as corresponding to a list of non-zero positions in the at least one input feature map. The list of non-zero positions can be obtained based on at least one sparsity map from a previous layer. The sparsity map is indicative of non-zero positions in a corresponding output feature map of the previous layer (which serves as an input feature map of the current layer). In such cases, the querying index and applying selected filters as described with reference to blocks 208 and 210 are performed only for the blocks that correspond to the non-zero positions in the at least one input feature map. Positions in the output feature maps corresponding to zero-positions in the at least one input feature map can be filled in with a value of zero. Therefore, the computational cost of the CNN is further reduced due to the saving of convolution operations for these zero-positions.

Figure 8:
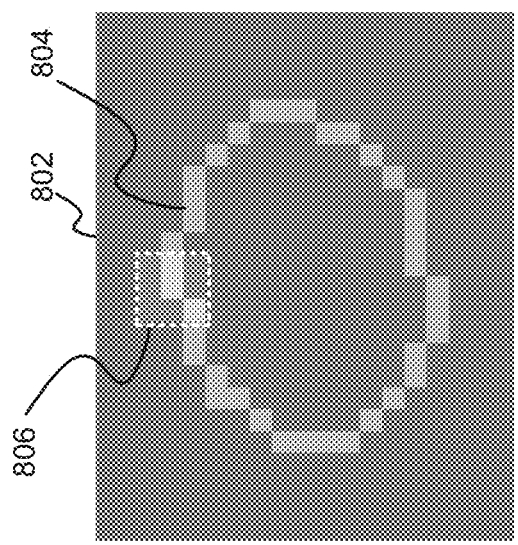
FIG. 8 illustrates an example of performing the querying and convolution only for non-zero positions of an input feature map in accordance with certain embodiments of the presently disclosed subject matter.
Figure 8:
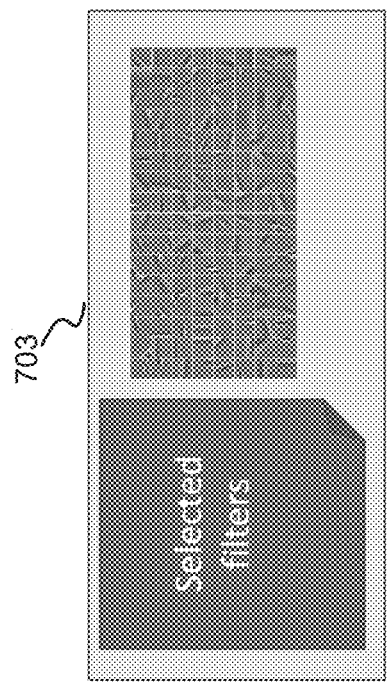

Referring now to FIG. 8, there is illustrated an example of performing the querying and convolution only for non-zero positions of an input feature map in accordance with certain embodiments of the presently disclosed subject matter.

There is shown an exemplary input feature map 802 in which the non-zero positions 804 form a circular pattern. The plurality of blocks can be selected so as to contour the circular pattern and cover the non-zero positions 804. One given block 806 is shown (squared with dashed line) for exemplary purposes. The querying index and applying selected filters as described with reference to blocks 208 and 210 are performed for the selected blocks. Since the rest of the input feature map 802 is composed of zero-positions, no blocks need to be selected therefrom and no further operations are required to be performed.

It is appreciated that the examples and embodiments illustrated with reference to the optimization process in the present description are by no means inclusive of all possible alternatives but are intended to illustrate non-limiting examples only.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer readable memory or storage medium tangibly embodying a program of instructions executable by the computer for executing the method of the invention.

The non-transitory computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the invention as hereinbefore described without departing from its scope, defined in and by the appended claims.

The invention claimed is:

1. A computerized method of optimization of operating a Convolutional Neural Network (CNN), the CNN comprising a plurality of layers each including one or more filters, the method being performed by a Processing and memory circuitry (PMC) and comprising:

for each given layer of the plurality of layers:
i) obtaining at least one input feature map;
ii) retrieving an index of the one or more filters in the given layer, wherein the index is query-able using maximum inner product search; and
iii) generating one or more output feature maps corresponding to the one or more filters based on the at least one input feature map, wherein each of the at least one input feature map includes a plurality of blocks, said generating comprising:
for each given block of the plurality of blocks,
querying the index to find a number of selected filters meeting a predetermined criterion related to respective inner products between the selected filters and the given block; and
applying the number of selected filters on the given block to obtain a number of output values for a given output position in a number of output feature maps corresponding to the number of selected filters, the given output position corresponding to the position of the given block, and filling in the given output position in the rest of output feature maps with a value of zero, thereby reducing computational cost of operating the CNN as compared to computational cost of having applied all of the one or more filters on the given block.

2. The computerized method of claim 1, wherein the CNN is pre-trained such that the one or more output feature maps in at least some of the plurality of layers have a given level of sparsity, and the predetermined criterion is determined with respect to the given level of sparsity.

3. The computerized method of claim 2, wherein each layer of the CNN is pre-trained by zeroing weak activations in one or more output feature maps in the at least some of the plurality of layers.

4. The computerized method of claim 1, wherein the index is generated using an indexing algorithm thereby enabling the index to be query-able using a maximum inner product search.

5. The computerized method of claim 4, wherein the indexing algorithm is a Locality-sensitive hashing (LSH) algorithm.

6. The computerized method of claim 4, wherein the indexing algorithm is a clustering algorithm.

7. The computerized method of claim 1, wherein the indexing algorithm includes transforming the filters to specific representations and sorting the specific representations to form the index, and wherein the generating further comprises, for each given block, performing the transformation on the given block giving rise to a corresponding representation, and querying the index using the corresponding representation.

8. The computerized method of claim 1, wherein the at least one input feature map comprises a plurality of input feature maps corresponding to a plurality of channels, and wherein the generating one or more output feature maps is performed for each of the input feature maps.

9. The computerized method of claim 8, further comprising generating a prediction map including, for each given block: a spatial position of the given block, the number of selected filters thereof, and a given channel of an input feature map where the given block locates, and wherein the prediction map is used, to apply the selected filters on the spatial position in the given channel.

10. The computerized method of claim 9, further comprising creating a sparsity map corresponding to an output feature map using the prediction map, the sparsity map being indicative of a list of non-zero positions in the output feature map.

11. The computerized method of claim 1, wherein the plurality of blocks are obtained by using a sliding window on the at least one input feature map with a predefined step size.

12. The computerized method of claim 1, wherein the plurality of blocks are obtained as corresponding to a list of non-zero positions on the at least one input feature map, the list of non-zero positions being obtained based on at least one sparsity map from a previous layer.

13. The computerized method of claim 12, further comprising filling in positions in the output feature maps corresponding to zero-positions in the at least one input feature map, with a value of zero.

14. The computerized method of claim 1, further comprising repeating said steps i)-iii) for each layer of the plurality of layers of the CNN, wherein the one or more output feature maps of a previous layer serve as the at least one input feature map of a current layer.

15. A computerized system of optimization of operating a Convolutional Neural Network (CNN), the CNN comprising a plurality of layers each including one or more filters, the system comprising a processor and memory circuitry (PMC) configured to:

for each given layer of the plurality of layers:
i) obtain at least one input feature map;
ii) retrieve an index of the one or more filters in the given layer, wherein the index is query-able using a maximum inner product search; and
iii) generate one or more output feature maps corresponding to the one or more filters based on the at least one input feature map, each of the at least one input feature map including a plurality of blocks, wherein the PMC is configured to generate the one or more output feature maps by:
for each given block of the plurality of blocks,
querying the index to find a number of selected filters meeting a predetermined criterion related to respective inner products between the selected filters and the given block; and
applying the number of selected filters on the given block to obtain a number of output values for a given output position in a number of output feature maps corresponding to the number of selected filters, the given output position corresponding to the position of the given block, and filling in the given output position in the rest of output feature maps with a value of zero, thereby reducing computational cost of operating the CNN as compared to computational cost of having applied all of the one or more filters on the given block.

16. The computerized system of claim 15, wherein the CNN is pre-trained such that the one or more output feature maps in at least some of the plurality of layers have a given level of sparsity, and the predetermined criterion is determined with respect to the given level of sparsity.

17. The computerized system of claim 16, wherein each layer of the CNN is pre-trained by zeroing weak activations in one or more output feature maps in the at least some of the plurality of layers.

18. The computerized system of claim 15, wherein the index is generated using an indexing algorithm thereby enabling the index to be query-able using a maximum inner product search.

19. The computerized system of claim 18, wherein the indexing algorithm is a Locality-sensitive hashing (LSH) algorithm.

20. The computerized system of claim 18, wherein the indexing algorithm is a clustering algorithm.

21. The computerized system of claim 15, wherein the indexing algorithm includes transforming the filters to specific representations and sorting the specific representations to form the index, and wherein the PMC is further configured to: for each given block, perform the transformation on the given block giving rise to a corresponding representation and query the index using the corresponding representation.

22. The computerized system of claim 15, wherein the at least one input feature map comprises a plurality of input feature maps corresponding to a plurality of channels, and wherein the PMC is configured to generate one or more output feature maps for each of the input feature maps.

23. The computerized system of claim 22, wherein the PMC is further configured to generate a prediction map including, for each given block: a spatial position of the given block, the number of selected filters thereof, and a given channel of an input feature map where the given block locates, and wherein the prediction map is used, to apply the selected filters on the spatial position in the given channel.

24. The computerized system of claim 23, wherein the PMC is further configured to create a sparsity map corresponding to an output feature map using the prediction map, the sparsity map being indicative of a list of non-zero positions in the output feature map.

25. The computerized system of claim 15, wherein the plurality of blocks are obtained by using a sliding window on the at least one input feature map with a predefined step size.

26. The computerized system of claim 15, wherein the plurality of blocks are obtained as corresponding to a list of non-zero positions on the at least one input feature map, the list of non-zero positions being obtained based on at least one sparsity map from a previous layer.

27. The computerized system of claim 26, wherein the PMC is further configured to fill in positions in the output feature maps corresponding to zero-positions in the at least one input feature map with a value of zero.

28. The computerized system of claim 15, wherein the PMC is further configured to repeat said steps i)-iii) for each layer of the plurality of layers of the CNN, wherein the one or more output feature maps of a previous layer serve as the at least one input feature map of a current layer.

29. A non-transitory computer readable medium comprising instructions that, when executed by a computer, cause the computer to perform a method of optimization of operating a Convolutional Neural Network (CNN), the CNN comprising a plurality of layers each including one or more filters, the method comprising:
for each given layer of the plurality of layers:
i) obtaining at least one input feature map;
ii) retrieving an index of the one or more filters in the given layer, wherein the index is query-able using a maximum inner product search; and
iii) generating one or more output feature maps corresponding to the one or more filters based on the at least one input feature map, wherein each of the at least one input feature map includes a plurality of blocks, said generating comprising:
for each given block of the plurality of blocks,
querying the index to find a number of selected filters meeting a predetermined criterion related to respective inner products between the selected filters and the given block; and
applying the number of selected filters on the given block to obtain a number of output values for a given output position in a number of output feature maps corresponding to the number of selected filters, the given output position corresponding to the position of the given block, and filling in the given output position in the rest of output feature maps with a value of zero, thereby reducing computational cost of operating the CNN as compared to computational cost of having applied all of the one or more filters on the given block.

* * * * *